(12) United States Patent
Jerde et al.

(10) Patent No.: US 8,924,798 B2
(45) Date of Patent: *Dec. 30, 2014

(54) GROUPING RELATED ERRORS IN A DISTRIBUTED COMPUTING ENVIRONMENT

(71) Applicant: International Business Machines Corporation, Armonk, NY (US)

(72) Inventors: Mark A. Jerde, Rochester, MN (US); Siobhan M. O'Toole, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,720

(22) Filed: Dec. 7, 2012

(65) Prior Publication Data

US 2013/0166967 A1  Jun. 27, 2013

Related U.S. Application Data

(63) Continuation of application No. 13/334,114, filed on Dec. 22, 2011.

(51) Int. Cl.
  *G06F 11/00* (2006.01)
  *G06F 11/07* (2006.01)
  *G06F 11/30* (2006.01)

(52) U.S. Cl.
  CPC ............ *G06F 11/30* (2013.01); *G06F 11/0781* (2013.01); *G06F 11/079* (2013.01); *G06F 11/0709* (2013.01); *G06F 11/0748* (2013.01); *G06F 11/3006* (2013.01); *G06F 11/3072* (2013.01)
  USPC ................................ 714/47.3; 714/48; 714/26

(58) Field of Classification Search
  USPC .................................. 714/26, 25, 47.1, 48, 37
  See application file for complete search history.

(56) References Cited

U.S. PATENT DOCUMENTS

| | | | |
|---|---|---|---|
| 6,651,183 | B1 | 11/2003 | Gensler, Jr. et al. |
| 6,675,315 | B1 | 1/2004 | Semler et al. |
| 6,715,062 | B1 | 3/2004 | Moore |
| 7,165,192 | B1 * | 1/2007 | Cadieux et al. .................. 714/43 |
| 7,373,554 | B2 * | 5/2008 | Chandrasekaran .......... 714/47.2 |
| 7,796,527 | B2 | 9/2010 | Archer et al. |
| 2007/0242611 | A1 | 10/2007 | Archer et al. |
| 2008/0005281 | A1 | 1/2008 | Hsueh et al. |
| 2009/0292951 | A1 * | 11/2009 | Fournier et al. .................. 714/37 |

(Continued)

OTHER PUBLICATIONS

Jerde et al.: "Grouping Related Errors in a Distributed Computing Environment", U.S. Appl. No. 13/334,114, filed Dec. 22, 2011.

*Primary Examiner* — Sarai Butler
(74) *Attorney, Agent, or Firm* — Patterson & Sheridan LLP (57) ABSTRACT

Techniques are described for detecting the occurrence of error scenarios occurring across a plurality of nodes. Embodiments retrieve a plurality of error scenario profiles. Each of the error scenario profiles specifies prerequisite criteria, the prerequisite criteria including at least one of (i) one or more errors and (ii) one or more conditions. The plurality of nodes is monitored to detect errors occurring on nodes within the plurality of nodes. Embodiments then detect the occurrence of an error scenario, when at least a portion the monitored errors match the prerequisite criteria specified in a first one of the error profiles and when the one or more conditions specified in the first error profile are satisfied.

9 Claims, 6 Drawing Sheets

(56) References Cited

U.S. PATENT DOCUMENTS

| | | | |
|---|---|---|---|
| 2010/0257410 A1* | 10/2010 | Cottrell et al. | 714/45 |
| 2011/0126041 A1* | 5/2011 | Matsubara | 714/4.11 |
| 2011/0231704 A1* | 9/2011 | Ge et al. | 714/26 |
| 2012/0151282 A1* | 6/2012 | Watanabe et al. | 714/49 |

* cited by examiner

GROUPING RELATED ERRORS IN A DISTRIBUTED COMPUTING ENVIRONMENT

CROSS-REFERENCE TO RELATED APPLICATIONS

This application is a continuation of co-pending U.S. patent application Ser. No. 13/334,114, filed Dec. 22, 2011. The aforementioned related patent application is herein incorporated by reference in its entirety.

BACKGROUND

Embodiments presented in this disclosure generally relate to computer software and, more particularly, to techniques for identifying and grouping related errors in a distributed computing environment.

Computer software comprises a set of instructions to be executed by a data processing system. Generally, computer software makes a data processing system useful by providing the instructions for the data processing system to carry out productive tasks. Computer software provides instructions that enable a data processing system to function as, for example, a word processing device, spreadsheet device, or an Internet browsing device. Generally, modern computer software is originally written in a computer programming language using syntactic constructs that are comprehensible by a programmer. The computer programming language represents the instructions embodied in the software. For example, in the "C" programming language, the syntactic term "print" is used to represent an instruction to the data processing system to print the contents of a particular data field. These types of computer programming languages are useful because their syntactic constructs increase the ease with which programmers can create computer software, since the programmers do not need to compose instructions in a language that would be directly understood by the data processing system. Writing instructions in such a language would be far more difficult because such languages bear little or no resemblance to any human language.

A computer program, or a portion thereof, written with such a human-comprehensible programming language is generally referred to as "source code". Such source code can then be compiled by a compiler to create "compiled code," which can also be referred to as "executable code." The executable code can then be executed by, for instance, the data processing system or an intermediate software layer. During execution of the compiled code, certain errors or exceptions may occur for a variety of reasons. For instance, an exception could occur if an instruction attempts to access a variable in an improper way (e.g., attempting to add to an Integer variable with a value of NULL). In some circumstances, the executable code can be configured to handle the exception automatically. However, certain exceptions cannot be properly handled within the executable code. For example, a network client application could throw an exception when the application is unable to connect to a corresponding network server application. While individual applications may be configured to handle exceptions occurring within the application, certain exceptions may be indicative of a greater problem.

SUMMARY

Embodiments provide a method, system and computer program product for detecting error scenarios occurring across a plurality of nodes. The method, system and computer program product include retrieving a plurality of error scenario profiles, wherein each of the plurality of error scenario profiles specifies prerequisite criteria. The prerequisite criteria include (i) one or more errors and (ii) one or more conditions. Additionally, the method, system and computer program product include monitoring the plurality of nodes to detect when errors occur on nodes within the plurality of nodes. The method, system and computer program product also include detecting the occurrence of an error scenario, when at least a portion of the occurring errors match the one or more errors specified in a first one of the error scenario profiles and when the one or more conditions specified in the first error scenario profile are satisfied.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments provide techniques for detecting the occurrence of error scenarios occurring across a plurality of nodes in a distributed computing system. Embodiments may retrieve a plurality of error scenario profiles. Here, each of the error scenario profiles may specify prerequisite criteria including at least one of (i) one or more errors and (ii) one or more conditions. As used herein, an error refers to any error message generated by a software or firmware component. For instance, one example of such an error is an exception thrown by a software application. As another example, a second error could be one or more lines in a log file to which error messages are written. Embodiments may monitor the plurality of nodes to detect errors occurring on the nodes and detect the occurrence of an error scenario when at least a portion the monitored errors match the prerequisite criteria specified in a first one of the error profiles and when the one or more conditions specified in the first error profile are satisfied. Embodiments could then generate a notification of the occurring error scenario (e.g., in a log file, by transmitting a message, etc.) Advantageously, doing so provides enhanced error reporting services for nodes in the distributed computing system.

Figure 1:
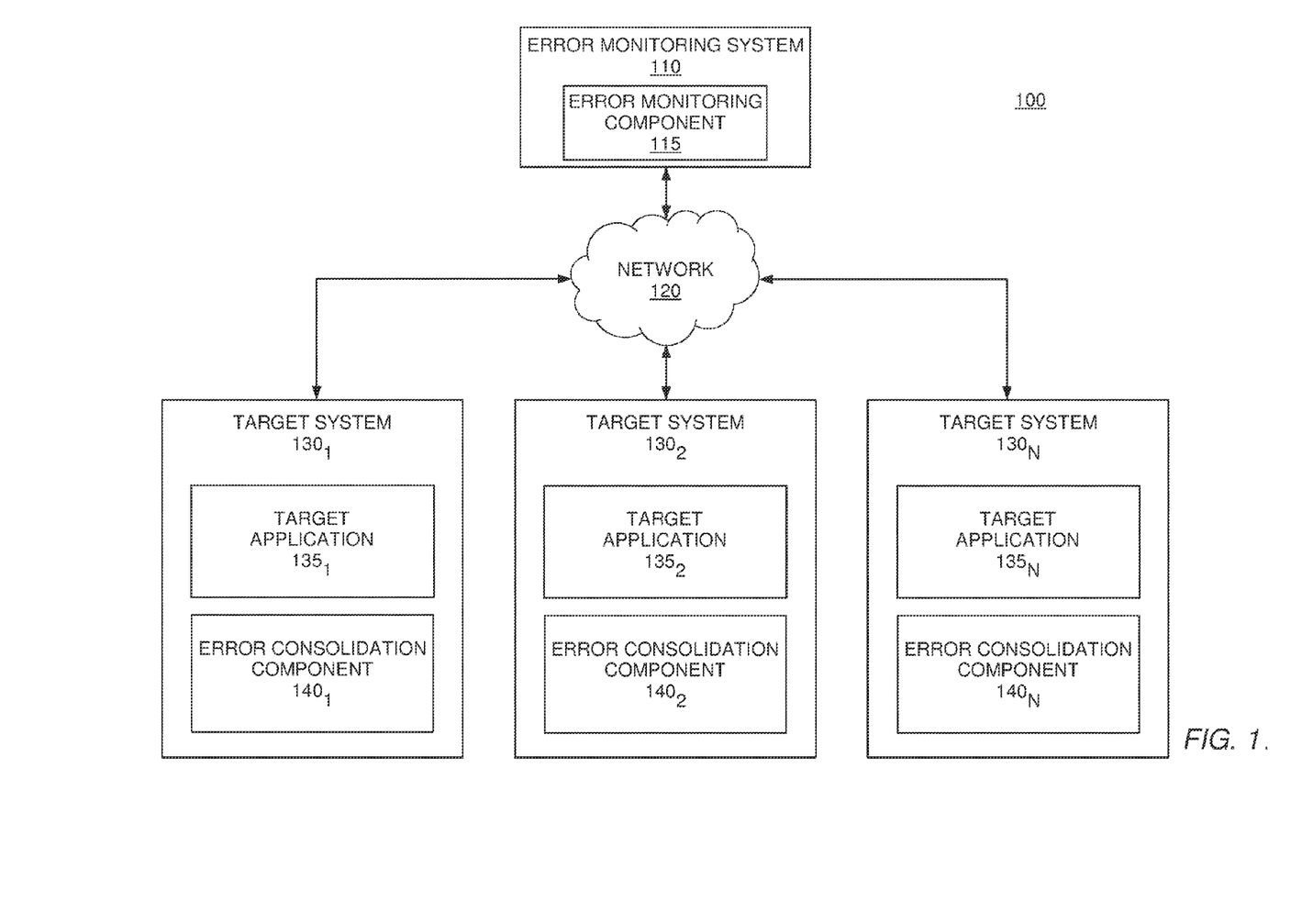
FIG. 1 is a block diagram illustrating a system configured with an error monitoring component, according to one embodiment described herein.

FIG. 1 is a block diagram illustrating a system configured with an error monitoring component, according to one embodiment described herein. As shown, the system 100 includes an error monitoring system 110 and a plurality of target systems 130$_{1-N}$ connected via a communications network 120. The error monitoring system 110 is configured with an error monitoring component 115. Additionally, each of the target systems 130$_{1-N}$ are configured with a target application 135$_{1-N}$ and an error consolidation component 140$_{1-N}$.

Generally, the error monitoring component 115 is configured to monitor errors occurring on the target systems 130$_{1-N}$ and to determine when an error scenario is occurring in the system 100. An error scenario broadly represents an event that results in the generation of one or more error messages. For example, an exemplary error scenario could occur when the target systems 130$_{1-N}$ lose network connectivity with a particular remote server. While an event such as the loss of network connectivity could be caused by a number of a reasons (e.g., network failure, hardware failure of the remote server, etc.), each occurrence of the event may result in the same or a similar set of errors from the target applications 135$_{1-N}$. For instance, each of the target applications 135$_{1-N}$ could be configured to generate a "NetworkException" when the target application is unable to connect to the remote server and could generate a log entry specifying that such an exception has occurred. As such, if the error monitoring component 115 determines that all of the target applications 135$_{1-N}$ are generating NetworkException, the error monitoring component 115 could determine that network connectivity between the target applications 135$_{1-N}$ and the remote server is interrupted.

To make such a determination, the error monitoring component 115 could be configured with an error scenario profile specifying this set of errors and one or more conditions under which the errors occur. As an example, one such condition could be that the errors must occur within a 5 minute window of time in order to match the error scenario profile. The error monitoring component 115 could then monitor errors from the target applications 135$_{1-N}$ and upon determining that a series of monitored errors match the error scenario profile, the error monitoring component 115 could detect that the error scenario is occurring and that network connectivity to the remote server is unavailable. Based on this, the error monitoring component 115 could generate a notification (e.g., to a system administrator of the system 100) specifying that the particular error scenario is occurring and that network connectivity to the remote server is unavailable. Advantageously, doing so provides enhanced error reporting capabilities for the system 100 and provides more meaningful information (e.g., to the system administrator) describing the errors that are occurring.

Additionally, each of the target systems 130$_{1-N}$ in the depicted embodiment are configured with a respective error consolidation component 140$_{1-N}$. Generally, each error consolidation component 140$_{1-N}$ is configured to monitor errors occurring in the target application 135$_{1-N}$ on the target system 130$_{1-N}$ on which the error consolidation component 140$_{1-N}$ is located and to provide enhanced error reporting capabilities. For instance, each error consolidation component 140$_{1-N}$ could be configured to identify a related series of errors from the corresponding target application 135$_{1-N}$ and to consolidate this series of errors into a single consolidated error. The error consolidation components 140$_{1-N}$ could be configured to consolidate errors using one or more error profiles, which specify a consolidated error, one or more prerequisite errors and one or more conditions. The error consolidation components 140$_{1-N}$ could then use the error profiles to generate a consolidated error whenever the prerequisite error(s) from the corresponding error profile are detected and the one or more conditions from the profile are satisfied. For instance, each error consolidation component 140$_{1-N}$ could generate the consolidated error to a separate error log from the error log produced by the corresponding target application 135$_{1-N}$. Doing so provides a separate, more concise error log which may be more easily reviewed and understood (e.g., by an administrator of the system 100). In one embodiment, the error consolidation components 140$_{1-N}$ are configured replace the series of errors in the error log generated by the corresponding target application 135$_{1-N}$ with the single consolidated error.

As an example, the error consolidation component 140$_1$ could be configured to determine that, when the target application 135$_1$ generates five or more IOExceptions within a period of 1 minute, this indicates that the target application 135$_1$ is unable read a particular configuration file on a mapped network drive. As such, the error consolidation component 140$_1$ could be configured with a first error profile for a "ConfigCannotBeRead" error specifying the IOException error and the conditions of "FIVE OR MORE IOExceptions WITHIN 1 MINUTE" and "APPLICATION STARTED WITHIN 10 MINUTES". If the error consolidation component 140$_1$ then detects that the target application 135$_1$ has generated 23 IOExceptions within 30 seconds of being started, the error consolidation component 140$_1$ could determine that this scenario matches the first error profile and accordingly could generate a ConfigCannotBeRead error message. Advantageously, doing so provides a more concise error log that can be more easily reviewed (e.g., by a system administrator). Furthermore, embodiments may provide enhanced error reporting capabilities that better describe the problem occurring on the system. That is, while an application could generate an IOException for any number of reasons, embodiments can more directly identify the problem (e.g., the configuration file cannot be read) and convey the problem by generating a consolidated error (e.g., a ConfigCannotBeRead error).

Of note, although the above example pertains to a condition implemented using a structured language, such an example is provided for illustrative purposes only and is without limitation. More generally, any conditional statement or expression of logic may be used consistent with embodiments described herein. In addition to considering errors and the timing in which they occur, an error profile or error scenario may also include an environmental condition. As used herein, an environmental condition refers to any conditional statement or logic that involves an element of the computing environment in which errors are being monitored. For instance, one example of an environmental condition for a particular error scenario could be "CPU USAGE ABOVE 50%". More generally, however, any element of the computing environment may be used in defining an environmental condition for an error profile or an error scenario.

Figure 2A:
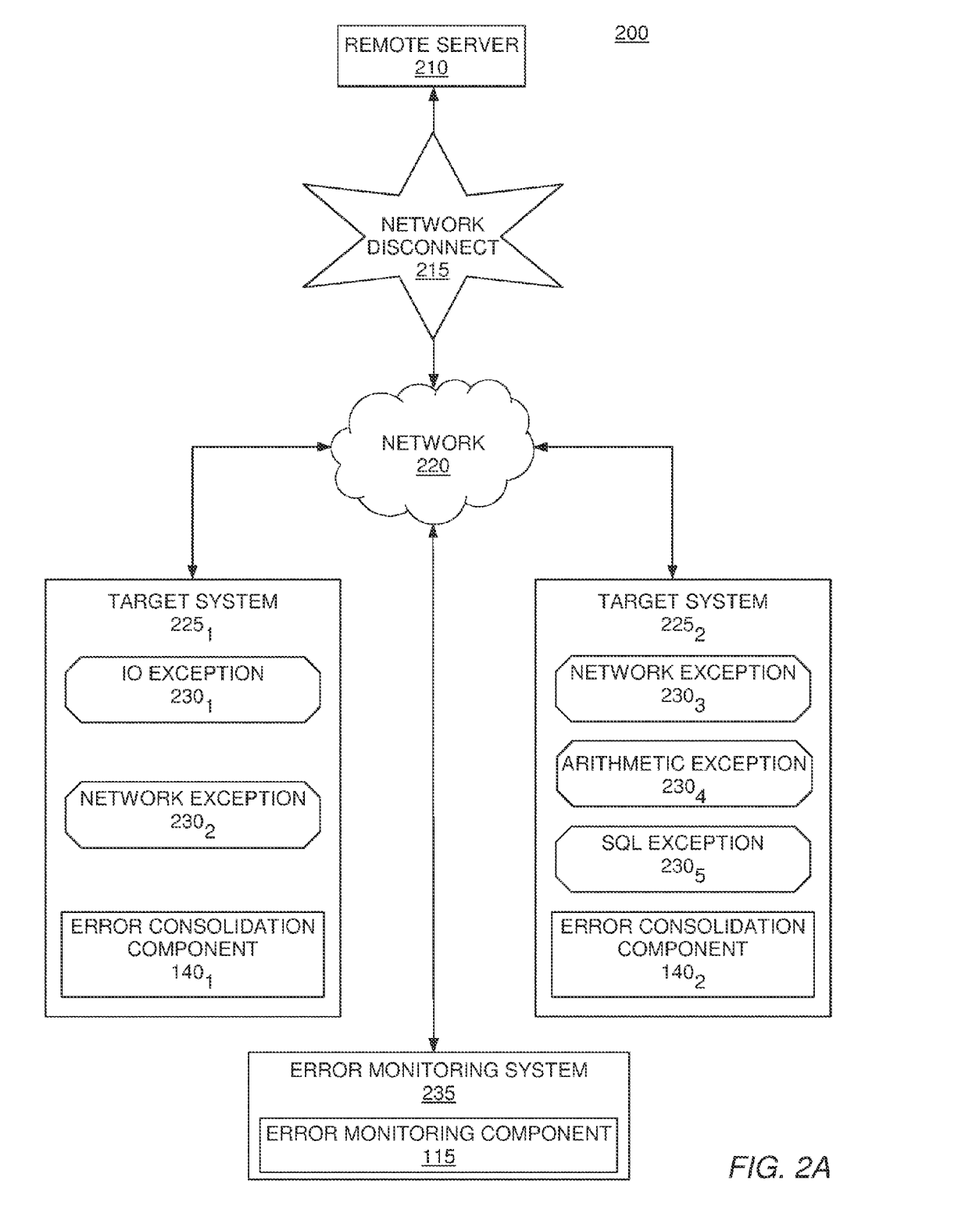
FIGS. 2A-B are block diagrams illustrating a system configured with an error monitoring component, according to one embodiment described herein.
Figure 2B:
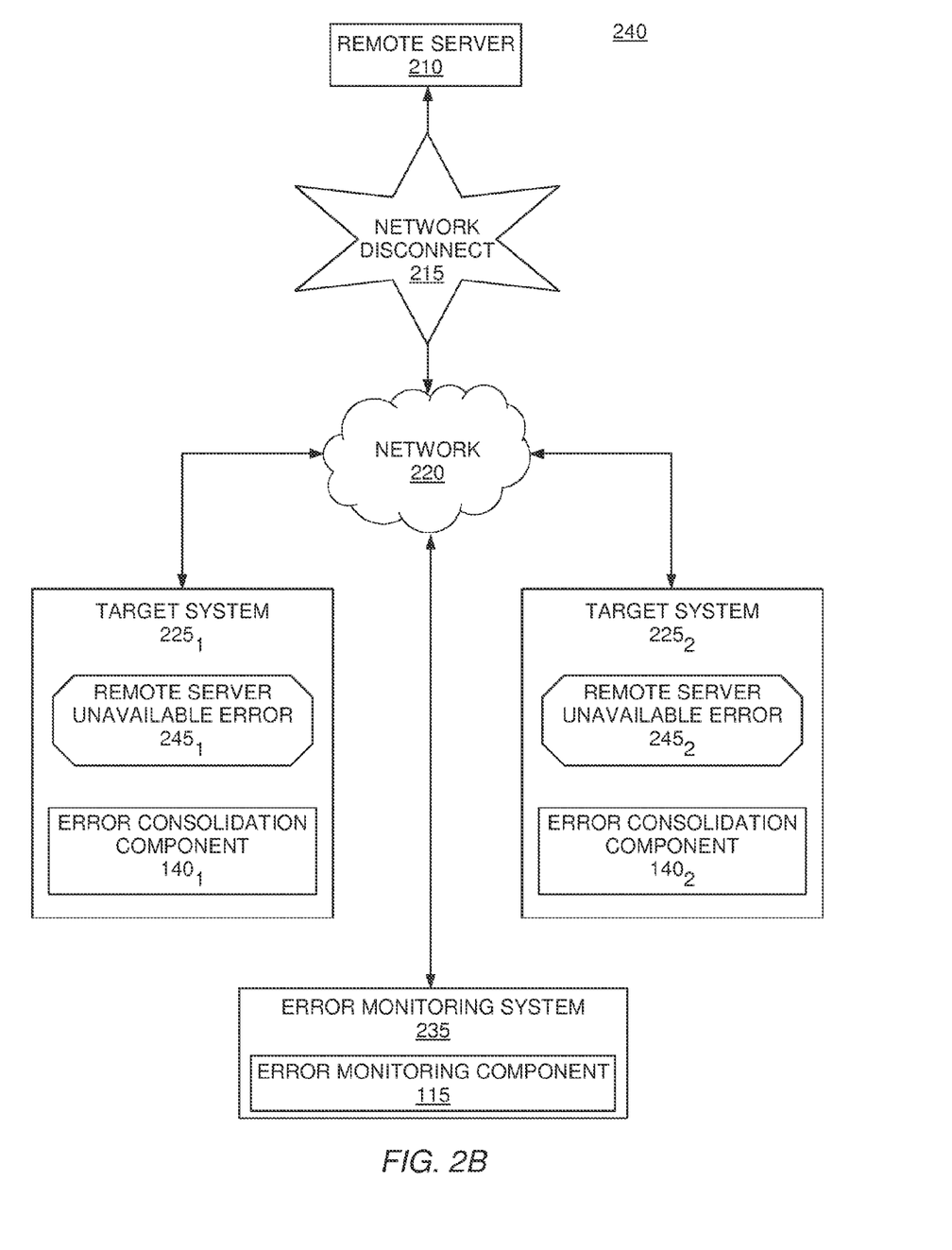

FIGS. 2A-B are block diagrams illustrating a system configured with an error monitoring component, according to one embodiment described herein. As shown, the system 200 includes a remote server 210, a plurality of target systems 225$_{1-2}$ and an error monitoring system 235, interconnected via a network 220. The error monitoring system 235 is configured with an error monitoring component 115. Additionally, in the depicted embodiment, each of the target systems 225$_{1-2}$ are configured with a respective error consolidation component 140$_{1-2}$. As discussed above, the error consolidation components 140$_{1-2}$ generally monitor errors occurring on their respective target systems 225$_{1-2}$ and group related errors together. In grouping related errors, the error consolidation components $140_{1-2}$ could be configured with error profiles that specify factors one or more types of errors and one or more conditions (e.g., the timestamp at which the errors occur).

Although the error consolidation components $140_{1-2}$ are depicted as residing on the target systems $225_{1-2}$, such a depiction is for illustrative purposes only and is without limitation. More generally, the error consolidation components $140_{1-2}$ may reside on one or more of the target systems $225_{1-2}$ or on any computer system(s) from which the functions described herein can be performed. Additionally, the error consolidation components $140_{1-2}$ may each be configured to monitor errors occurring on more than one system. In such an embodiment, the error profiles used by the error consolidation components $140_{1-2}$ may further specify a condition describing the location of the hardware where the error was detected, thereby allowing the error consolidation components $140_{1-2}$ to consider the location where the remote errors occur in grouping related errors. Thus, in an alternate embodiment, a single error consolidation component 140 could monitor the target systems $225_{1-2}$ while residing on another computer system (e.g., the error monitoring system 235).

Returning to the depicted embodiment, a number of logged errors $230_{1-5}$ are shown on the target systems $225_{1-2}$. As discussed above, an error as used herein refers to any error message that is generated by a software or firmware component. In the present example, assume that the errors $230_{1-5}$ are caused due to the network disconnect 215 preventing the target systems $225_{1-2}$ from communicating with the remote server 210 and that the errors $230_{1-5}$ occurred within 2 minutes of one another. Furthermore, assume that the error consolidation component $140_1$ is configured with a first error profile for a "Remote Server Unavailable Error", specifying an IOException and a NetworkException and the condition that "TWO OR MORE EXCEPTIONS WITHIN 5 MINUTES". Additionally, assume that the error consolidation component $140_2$ is configured with a second error profile for a "Remote Server Unavailable Error", specifying a NetworkException, an ArithmeticException and a SQLException and the condition "ONE OR MORE OF EACH EXCEPTION WITHIN 10 MINUTES".

As such, the error consolidation components $140_{1-2}$ could monitor the errors $230_{1-5}$ occurring on the respective target system $225_{1-2}$, and upon determining that both the first error profile and the second error profile are satisfied, could generate a "Remote Server Unavailable Error" on each of the target systems $225_{1-2}$ (i.e., as specified in each of the error profiles). An example of this is shown in FIG. 2B, which is a block diagram illustrating a system configured with an error monitoring component, according to one embodiment described herein. Similar to FIG. 2A, FIG. 2B shows a system 240 containing a remote server 210, two target systems $225_{1-2}$ and an error monitoring system 235, all interconnected via the network 220. Furthermore, a network disconnect 215 is shown, preventing the target systems $225_{1-2}$ and the error monitoring system 235 from communicating with the remote server 210.

As shown, the error consolidation components $140_{1-2}$ have determined that particular ones of the errors $230_{1-5}$ and the conditions under which the errors $230_{1-5}$ were generated match the first and second error profiles. In response to this determination, the error consolidation components $140_{1-2}$ have generated Remote Server Unavailable Errors $245_{1-2}$. Advantageously, doing so provides enhanced error reporting functionality for the target systems $225_{1-2}$ by providing more informative and intuitive error messages for an administrator of the systems $225_{1-2}$ to review. For instance, an ArithmeticException (such as the exception $230_4$ shown in FIG. 2A) could be caused by any number of reasons and thus an administrator viewing such an error may not immediately understand the source or cause of such an error. Thus, by determining that the ArithmeticException $230_4$ together with the other exceptions 230 satisfied the error profiles for a Remote Server Unavailable Error, the error consolidation components $140_{1-2}$ can generate a more informative error message and notify the administrator that applications on the target systems $225_{1-2}$ are unable to communicate with the remote server 210.

Additionally, the error monitoring component 115 can monitor errors occurring across the target systems $225_{1-2}$ and can detect when one or more error scenarios arise. As discussed above, the error monitoring component 115 could be configured with a plurality of error scenario profiles, each of which corresponds to a respective error scenario and specifies one or more errors and one or more conditions. The error monitoring component 115 may then use the error scenario profiles to determine when an error scenario is occurring within the monitored computing environment.

For example, the error monitoring component 115 could be configured with an error scenario profile for a Network Disconnect error that specifies one or more Remote Server Unavailable error and a condition specifying that the Remote Server Unavailable errors occur within 5 minutes of one another. Additionally, assume that the error scenario profile specifies a condition that the Remote Server Unavailable errors occur while an instance of an application running on each of the target systems $225_{1-2}$ is configured to query a remote address. In such an example, if the error monitoring component 115 determines that the error consolidation components $140_{1-2}$ have generated the Remote Server Unavailable errors $245_{1-2}$ within a 5 minute window of time, the error monitoring component 115 could further determine whether the instances of the application are configured to query a server having a remote address (e.g., by parsing a configuration file associated with the application instances, by querying a database for configuration information for the application instances, etc.). If so, the error monitoring component 115 could determine that the current sequence of events matches the error scenario profile and thus could determine that the Network Disconnect error scenario is occurring.

In one embodiment, the error monitoring component 115 is configured to predict a likelihood that a particular error scenario is occurring based on the error scenario profile associated with the error profile. For example, the error scenario profile could specify a number of error messages to monitor for and a plurality of conditions that are satisfied when the error scenario is occurring. If the error monitoring component 115 then detects that some, but not all, of the specified error messages and further detects that some, but again not all, of the plurality of conditions are satisfied, the error monitoring component 115 could calculate a likelihood that the error scenario is occurring. As an example, the error monitoring component 115 could be configured to determine a percentage of the specified errors that are detected and a percentage of the conditions that are satisfied. The error monitoring component 115 could then determine a likelihood the error scenario is occurring based on the calculated percentages.

In a particular embodiment, the error monitoring component 115 is configured with error scenario profiles that specify a respective weight for each of the error messages and conditions in the profile. The error monitoring component 115 could then use the weights to calculate the likelihood that the corresponding error scenario is occurring. That is, the error monitoring component 115 could use the weights to assign more influence to particular errors and conditions than others.

As an example, a particular error scenario could occur when a number of NetworkExceptions occur within a 5 minute window of time and when the CPU usage of the monitored system exceeds 85% for the 5 minute window of time. However, if such NetworkExceptions frequently occur at other times when the error scenario is not occurring (e.g., when the CPU usage does not exceed 85%), the error monitoring component 115 could assign a stronger weight to the condition of the CPU usage exceeding 85% and could assign a weaker weight to the NetworkExceoption in the error scenario profile. Advantageously, doing so allows the error monitoring component 115 to more accurately predict occurrences of error scenarios.

Figure 3:
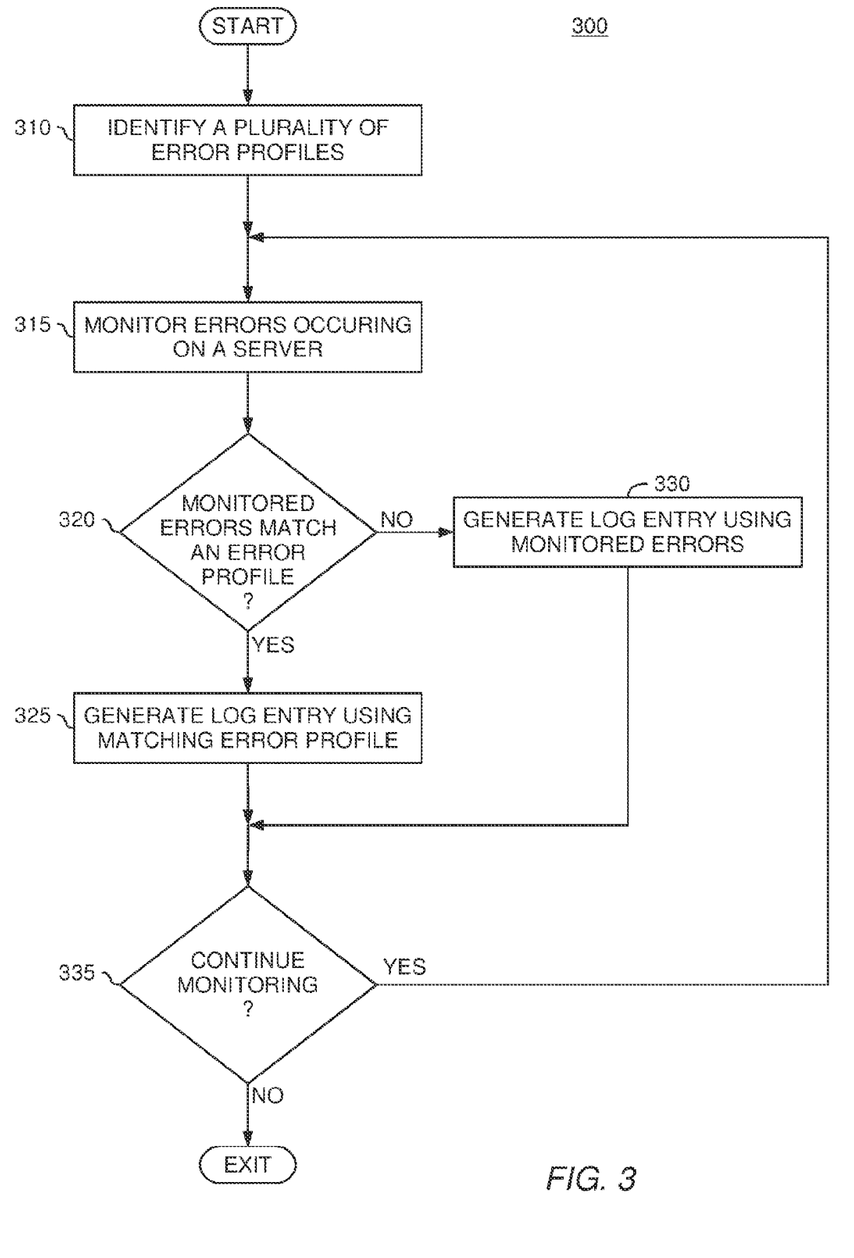
FIG. 3 is a flow chart illustrating a method for consolidating errors on a computer system, according to one embodiment described herein.

FIG. 3 is a flow chart illustrating a method for consolidating errors on a computer system, according to one embodiment described herein. As shown, the method 300 begins at step 310, where the error consolidation component 140 identifies a plurality of error profiles. Each of the error profiles may specify at least one prerequisite error, at least one condition and an enhanced error. Generally, the error consolidation component 140 is configured to use the error profiles to provide enhanced error reporting services. More specifically, the error consolidation component 140 may use the error profiles to determine that an enhanced error has occurred when the prerequisite error and the condition in the corresponding error profile have been satisfied.

As an example, a first error profile could specify the error of a "NetworkException" and the condition of "3 NetworkExceptions WITHIN 15 minutes". The first error profile could further specify that a "NetworkConnectionLost" enhanced error should be generated whenever the specified error (i.e., a "NetworkException") is detected and the condition is satisfied (i.e., when 3 or more NetworkExceptions are detected within a time window of 15 minutes). If the error consolidation component 140 then detects that a particular application has thrown a "NetworkException" three times within a period of 15 minutes, the error consolidation component 140 could generate a log specifying that a "NetworkConnectionLost" enhanced error has occurred. In one embodiment, the error consolidation component 140 is configured to generate the enhanced error in lieu of the specified error (i.e., the "NetworkException" error). In such an embodiment, the error consolidation component 140 may reduce the length of the error logs by consolidating multiple error messages into a single enhanced error message.

Once the plurality of error profiles is retrieved, the error consolidation component 140 monitors errors occurring on a server (step 315). Here, the server can be the computer system on which the error consolidation component 140 is executing or, alternatively, the server can be a remote computer system. The error consolidation component 140 then determines whether the monitored errors satisfy any of the error profiles (step 320). That is, the error consolidation component 140 determines whether there are any error profiles in the plurality of error profiles for which the specified error(s) have been detected and the specified condition(s) have been satisfied.

Upon determining that one of the error profiles is satisfied, the error consolidation component 140 generates an error log entry specifying the enhanced error specified in the satisfied error profile (step 325). If instead the error consolidation component 140 determines that no error profiles are satisfied, the error consolidation component 140 generates a log entry using the monitored errors (step 330). Once the error log containing either the enhanced error or the monitored errors is generated, the error consolidation component 140 determines whether it should continue monitoring for errors on the server (step 335). If the error consolidation component 140 determines it should continue monitoring errors, the method 300 returns to step 315, where the error consolidation component 140 again monitors errors occurring on the server. On the other hand, if the error consolidation component 140 determines it should cease monitoring errors, the method 300 ends.

Advantageously, by using the method 300, embodiments may transform one or more error messages into an enhanced error message that can provide a system administrator a better understanding of any problems occurring on the monitored server. That is, if the system administrator knows of a problem that can occur on the system that results in particular error messages under certain conditions, the administrator can create an error profile describing this problem and specifying an enhanced error that is used to indicate subsequent occurrences of the problem. The error consolidation component 140 can then use the created error profile to detect subsequent occurrences of the known problem and to alert the administrator of these subsequent occurrences (e.g., by generating a notification specifying the enhanced error has occurred). Additionally, the method 310 can be used to consolidate multiple error messages into a single, enhanced error message. This may result in reduced clutter in the error logs, making the error logs more understandable when viewed by an administrator.

Figure 4:
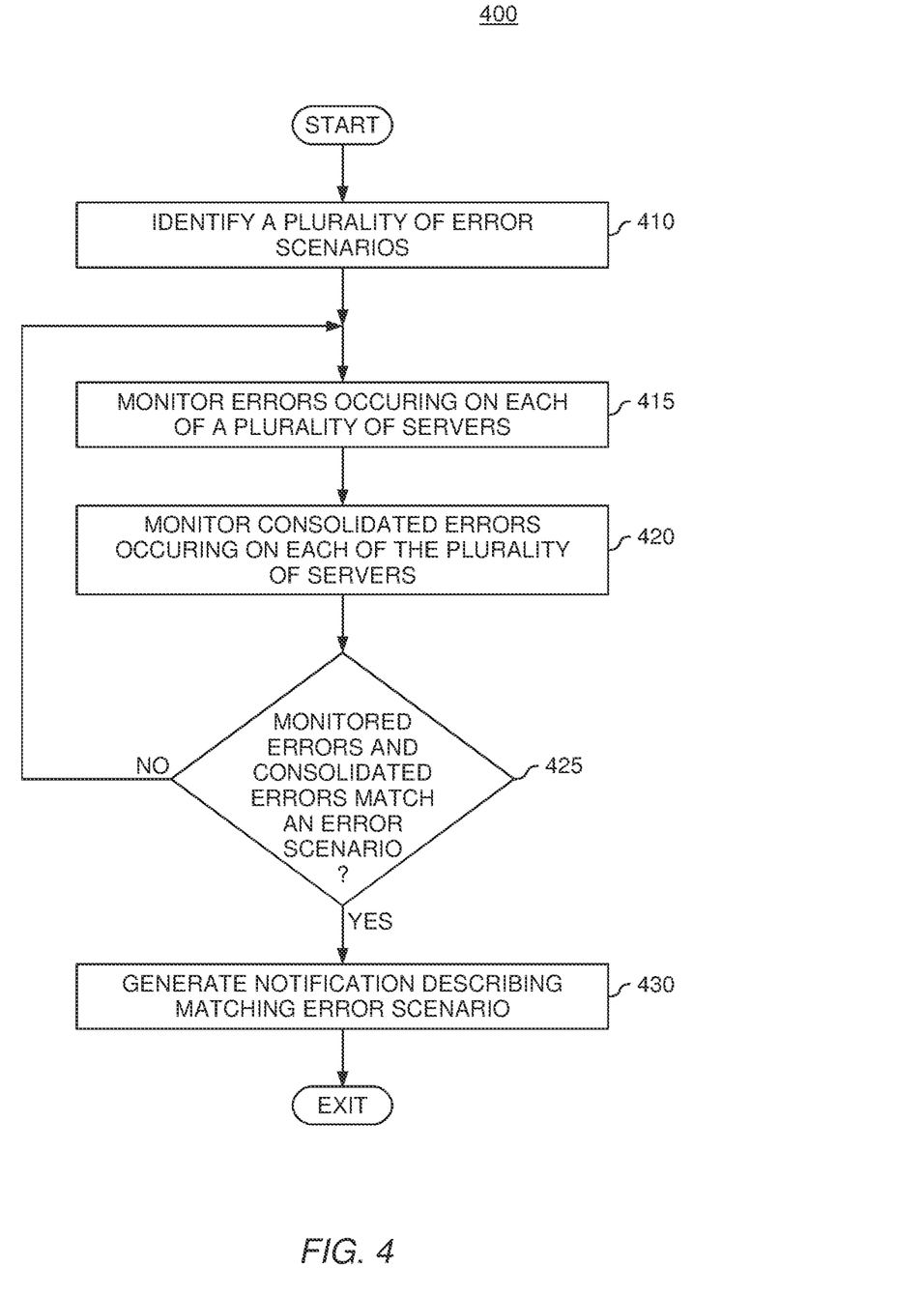
FIG. 4 is a flow chart illustrating a method for detecting error scenarios, according to one embodiment described herein.

FIG. 4 is a flow chart illustrating a method for detecting error scenarios in a distributed computing system, according to one embodiment described herein. As shown, the method 400 begins at step 410, where the error monitoring component 115 identifies a plurality of error scenario definitions. Similar to the error profiles discussed above with regard to FIG. 3, the error scenarios definitions may specify one or more errors and one or more prerequisite conditions. The error monitoring component 115 may then determine a particular one of the error scenarios is occurring within a distributed computing system when the specified one or more errors for the scenario are detected and the one or more prerequisite conditions for the scenario are satisfied.

Once the plurality of error scenarios are identified, the error monitoring component 115 monitors errors occurring on each of a plurality of servers (step 415). In the depicted embodiment, each of the servers is configured with a respective error consolidation component 140 that provides enhanced error reporting functionality for the server. As such, the error monitoring component 115 further monitors consolidated errors and enhanced errors occurring on each of the plurality of servers (step 420).

The error monitoring component 115 then determines whether the monitored errors and consolidated errors satisfy one of the identified error scenario definitions (step 425). As discussed above, the error monitoring component 115 may determine a particular error scenario is occurring when the errors specified in the error scenario definition are detected and when the conditions specified in the error scenario definition are satisfied.

In a particular embodiment, the error monitoring component 115 is configured to determine a likelihood that a particular error scenario is occurring. For instance, a particular error scenario could specify a substantial number of errors that must be detected and a substantial number of conditions that must be satisfied. If the error monitoring component 115 determines that all of the specified errors have been detected and that all but one of the specified conditions are satisfied, it is very likely that the error scenario is occurring even though the entirety of the conditions have not yet been satisfied. In making such a determination, the error monitoring component 115 could be configured to determine a likelihood that the error scenario is occurring and to compare the determined likelihood with a threshold likelihood value. Upon determining that the determined likelihood exceeds the threshold value, the error monitoring component 115 could determine that the error scenario is indeed occurring. Advantageously, doing so allows the error monitoring component 115 to detect occurrences of error scenarios more quickly and without waiting for the entirety of the specified errors to be detected and/or the specified conditions to be satisfied.

If the error monitoring component 115 determines that none of the error scenarios are satisfied, the method 400 returns to step 415, where the error monitoring component 115 monitors errors occurring on each of the plurality of servers. If instead the error monitoring component 115 determines that an error scenario is occurring (or is likely to be occurring), the error monitoring component 115 generates a notification describing the error scenario (step 430) and the method 400 ends. The error monitoring component 115 could then be configured to transmit the generated notification to, for example, a system administrator for the distributed computing system. In one embodiment, the error monitoring component 115 is configured to generate a log entry specifying the error scenario has occurred.

In yet another embodiment, the error monitoring component 115 is configured to perform a remedial action upon determining an error scenario is occurring. For example, a particular error scenario could occur when one of the nodes in the distributed computing system runs low on system memory. In such an example, the error monitoring component 115 could be configured to automatically restart the node and/or applications running on the node in order to free up additional memory. As another example, another error scenario could occur whenever two nodes on a particular subnet are using duplicate IP addresses. In such an example, the error monitoring component 115 could be configured to automatically release the IP address for one of the nodes and to request a new IP address for the node from the DHCP server. Advantageously, by doing so, embodiments can automatically detect and resolve the duplicate IP address conflicts within the subnet through the use of the error scenario profiles.

Figure 5:
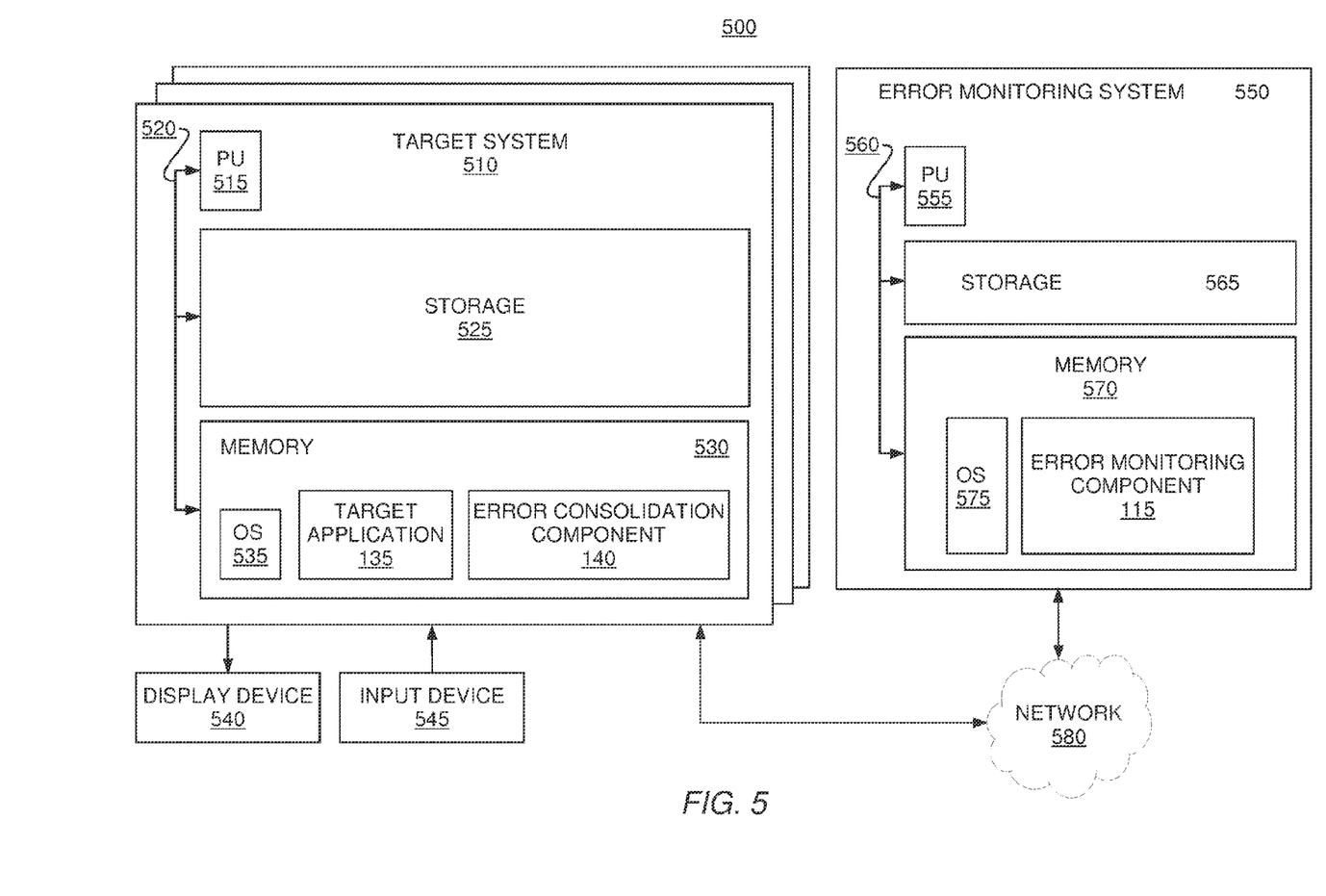
FIG. 5 is a block diagram illustrating a system configured with an error monitoring component, according to one embodiment described herein.

FIG. 5 is a block diagram illustrating a system configured with an error monitoring component, according to one embodiment described herein. As shown, the system 500 includes a plurality of target systems 510 and an error monitoring system 550, communicatively coupled via a network 580. In one embodiment, the target system 510 represents an existing system, e.g., network devices (i.e., routers, switches, etc.), desktop computers, server computers, laptop computers, gaming consoles, hand-held gaming devices and the like. The target system 510 illustrated in FIG. 5, however, is merely an example of a system in which embodiments of the present invention may be used. Embodiments of the present invention may be implemented differently, regardless of whether the computer system is a complex multi-user computing system, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, the target system 510 includes, without limitation, a processor 515, which obtains instructions and data via a bus 520 from a memory 525. Processor 515 is a programmable logic device that performs instruction, logic, and mathematical processing, and may be representative of one or more CPUs. The target system 510 is operably connected to the network 580, e.g., via network interfaces. Additionally, the target systems 510 each are coupled to display devices 540 and input devices 545. The display devices 540 may include output devices such as monitors, touch screen displays, and so on. The input devices 545 represent a wide variety of input devices, including keyboards, mice, controllers, and so on. Furthermore, the input devices 545 may include a set of buttons, switches or other physical device mechanisms for controlling the target system 510.

The memory 530 is any memory sufficiently large to hold the necessary programs and data structures. Memory 530 could be one or a combination of memory devices, including Random Access Memory, nonvolatile or backup memory (e.g., programmable or Flash memories, read-only memories, etc.). In addition, memory 530 may be considered to include memory physically located elsewhere; for example, on another computer coupled to the target system 510 via bus 520. The memory 530 includes a target application 135, an error consolidation component 140 and an operating system ("OS") 535. Operating system 535 is software used for managing the operation of the target system 510. Examples of OS 535 include UNIX, versions of the Microsoft Windows® operating system and distributions of the Linux® operating system. (Note: Linux is a trademark of Linus Torvalds in the United States and other countries.) More generally, any operating system 535 capable of performing the functions described herein may be used.

As shown, the target systems 510 are communicatively connected to the error monitoring system 550 via the network 580. The error monitoring system 550 in the depicted embodiment includes, without limitation, a processor 555, which obtains instructions and data via a bus 560 from a memory 570 and storage 565. Processor 555 is a programmable logic device that performs instruction, logic, and mathematical processing, and may be representative of one or more CPUs. Storage 565 is representative of hard-disk drives, flash memory devices, optical media and the like. Generally, the storage 565 stores application programs and data for use by the error monitoring system 550. The error monitoring system 550 is operably connected to the network 580, e.g., via a network interface.

The memory 570 is any memory sufficiently large to hold the necessary programs and data structures. Memory 570 could be one or a combination of memory devices, including Random Access Memory, nonvolatile or backup memory (e.g., programmable or Flash memories, read-only memories, etc.). In addition, memory 570 and storage 565 may be considered to include memory physically located elsewhere; for example, on another computer coupled to the error monitoring system 550 via bus 560. The memory 570 includes an error monitoring component 115 and an OS 575. Operating system 575 is software used for managing the operation of the error monitoring system 550. Examples of OS 575 include UNIX, versions of the Microsoft Windows® operating system and distributions of the Linux® operating system. More generally, any operating system 575 capable of performing the functions described herein may be used.

As discussed above, the error consolidation component 140 can monitor errors generated by the target application 135 on the respective target system 510. Upon determining that a series of generated errors and the conditions under which the errors were generated match an error profile, the error consolidation component 140 could generate one or more consolidated error messages. Additionally, the error monitoring component 115 could monitor errors (including consolidated error messages) occurring across the plurality of target systems 510. Upon determining that a series of errors across the target systems 510 match an error scenario profile, the error monitoring component 115 could determine the error scenario specified by the matching error scenario profile is occurring. The error monitoring component 115 could then generate a notification of the error scenario determined to be occurring (e.g., by transmitting a message to a system administrator, by writing to a log file, etc.).

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, an error consolidation component 140 could be configured to monitor errors generated by one or more applications within the cloud and upon determining that a particular set of the monitored errors correspond to an error profile, the error consolidation component 140 could generated a consolidated error message. Additionally, an error monitoring component 115 could monitor errors generated across a plurality of nodes within the cloud. Upon determining that a set of monitored errors match an error scenario profile, the error monitoring component 115 could determine the error scenario corresponding to the error scenario profile is occurring and could generate a notification of the error scenario. Doing so provides enhanced error notification services for applications running on the cloud resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of detecting error scenarios occurring across a plurality of nodes, comprising:
retrieving a plurality of error scenario profiles, wherein each of the plurality of error scenario profiles specifies (i) one or more errors and (ii) one or more conditions, of which a first condition specifies at least one of: (a) a measure of utilization for at least one of the plurality of nodes (b) an error occurrence frequency for the one or more errors, and (c) a characteristic of an application associated with the one or more errors;
monitoring the plurality of nodes to detect when errors occur on nodes within the plurality of nodes; and
detecting the occurrence of an error scenario, when at least a portion of the occurring errors match the one or more errors specified in a first one of the error scenario profiles and when at least a subset of the one or more conditions specified in the first error scenario profile are satisfied, comprising:
calculating a likelihood of the occurrence of the error scenario occurring, based on the at least a portion of the occurring errors that match the one or more errors and further based on the at least a subset of the conditions that are satisfied, wherein only a subset of the one or more errors and one or more conditions specified in the first error scenario profile are satisfied, and wherein at least one of (i) the one or more errors and (ii) the one or more conditions specified in the first error scenario profile are not satisfied; and
upon determining that the likelihood exceeds the predefined threshold measure of likelihood, determining that error scenario is occurring.

2. The method of claim 1, further comprising:
generating a notification specifying at least the detected occurrence of the error scenario.

3. The method of claim 1, wherein the at least one node is further configured to retrieve a plurality of error profiles, wherein each of the plurality of error profiles specifies at least one of (i) one or more errors and (ii) one or more conditions, wherein the at least one node is configured to monitor errors occurring on the node and to determine a consolidated error has occurred when the one or more errors specified in one of the plurality of error profiles are detected and when the one or more conditions in the error profile are satisfied, and wherein the monitored errors include at least one consolidated error.

4. The method of claim 1, wherein each of the plurality of error scenario profiles includes a respective weight for each of the one or more errors and the one or more conditions specified in the profile, and wherein determining a likelihood of the occurrence of the error scenario is further based on the weights included in the error scenario profile.

5. The method of claim 1, further comprising:
receiving error scenario information for a new error scenario specifying at least a name for the new error scenario;
receiving a selection of two or more errors from the monitored errors to be associated with the new error scenario; and
generating a new error scenario profile based on the received error scenario information and the received selection of two or more errors.

6. The method of claim 5, further comprising:
receiving a selection of one or more conditions to be associated with the new error scenario,
wherein generating the new error scenario profile is further based on the received selection of one or more conditions.

7. The method of claim 1, wherein monitoring the plurality of nodes further comprises:
for each of the plurality of nodes, monitoring a respective error log, wherein each of the plurality of nodes is configured to generate a log entry upon detecting the occurrence of one or more errors on the node.

8. The method of claim 1, wherein calculating the likelihood of the occurrence of the error scenario occurring further comprises:
calculating a first percentage of the one or more errors specified in the first error scenario profile that are occurring;
calculating a second percentage of the one or more conditions specified in the first error scenario profile that are satisfied; and
calculating the likelihood of the error scenario occurring based on the first calculated percentage of the specified one or more errors that are occurring and the second percentage of the one or more conditions that are satisfied.

9. The method of claim 1, further comprising:
in response to detecting the occurrence of an error scenario, performing one or more remedial actions comprising at least one of: (i) restarting a first node of the plurality of nodes, (ii) restarting an application on one of the plurality of nodes, (iii) releasing an IP address on one of the plurality of nodes, and (iv) renewing an IP address on one of the plurality of nodes.

* * * * *